(12) United States Patent
Bradley

(10) Patent No.: US 6,742,014 B2
(45) Date of Patent: *May 25, 2004

(54) CONDITIONAL CARRY ENCODING FOR CARRY SELECT ADDER

(75) Inventor: Douglas H. Bradley, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/259,015

(22) Filed: Sep. 27, 2002

(65) Prior Publication Data

US 2003/0028576 A1 Feb. 6, 2003

Related U.S. Application Data

(63) Continuation of application No. 09/352,259, filed on Jul. 13, 1999, now Pat. No. 6,496,846.

(51) Int. Cl.[7] .................................................. G06F 7/50
(52) U.S. Cl. ........................................ 708/710; 708/712
(58) Field of Search ................................ 708/710, 711, 708/712, 713, 714, 702, 704

(56) References Cited

U.S. PATENT DOCUMENTS

| | | | | |
|---|---|---|---|---|
| 5,095,458 A | * | 3/1992 | Lynch et al. | 708/713 |
| 5,375,081 A | * | 12/1994 | Anderson | 708/712 |
| 5,719,803 A | | 2/1998 | Naffziger | |
| 6,496,846 B1 | * | 12/2002 | Bradley | 708/710 |

* cited by examiner

Primary Examiner—Chuong Dinh Ngo

(57) ABSTRACT

The inventive mechanism encodes the carry in as well as the operand bits for each place in a binary addition of two streams of bits. The carry ins are encoded as Propagate (Pin), Kill (Kin), and Generate (Gin), with respect to the carry in to a block of bits. Only one of the signals would be high at any time, and the other two would be low. The Pin signal for a bit is true where the bit has a carry in that is the same as the carry in to the block of bits, i.e., the carry in to the block is propagated up to the particular bit. The Kin signal for a bit is true where a carry in to the bit is zero regardless of the carry in to the block, i.e., any carry in to the block is killed before it gets to the bit. The Gin signal for a bit is true where the bit has a carry in of one regardless of carry in to the block, i.e., the carry in to the bit is generated within the block. These signals are used in the calculation of the sum of the operand bits.

21 Claims, 2 Drawing Sheets

CONDITIONAL CARRY ENCODING FOR CARRY SELECT ADDER

CROSS-REFERENCE TO RELATED APPLICATIONS

This application is a continuation of U.S. patent application Ser. No. 09/352,259 entitled "CONDITIONAL CARRY ENCODING FOR CARRY SELECT ADDER," filed Jul. 13, 1999, now U.S. Pat. No. 6,496,846 the disclosure of which is hereby incorporated herein by reference.

FIELD OF THE INVENTION

This invention relates in general to binary addition, and in specific to encoding the carry in for each bit of the operands in an addition calculation.

DESCRIPTION OF THE RELATED ART

Binary addition is similar to numerical addition. The most basic form of binary addition entails starting with the least significant digit, and adding the two numbers, and moving a carry, if any, into the next significant digit addition. For example, consider the addition of the bit stream 010 and a bit stream 111. The addition of the least significant bits is 0+1, with a sum of 1, and a carry out of 0. The addition of the next significant bits are 1+1 plus a carry in of 0, with a sum of 0, and a carry out 1. The addition of the next significant bits are 0+1 plus a carry in of 1, with a sum of 0, and a carry out 1. Thus, the addition yields 001 plus a carry out of 1, or 1001.

The sequential addition described above works well for small bit streams, e.g. 3 bits, but becomes inefficient for large bit streams, e.g. 64 bits. Thus, the prior art uses carry select addition, which is similar to sequential addition, but breaks the bit streams into smaller blocks and performs two calculations, a first assuming that the carry bit is a zero, the second assumes the carry bit is a one. For example, consider a bit stream of 100101 which is added to bit stream 110001, this would yield 1010110 using sequential addition. With carry select addition these streams would be split into blocks 100 & 101 and 110 & 001, respectively. The addition of the blocks are 101+001 and 100+110. Now 100+110 would be calculated in two ways, the first assumes a carry in of 0 and the second assumes a carry in of 1. Thus, 100 +110+0=1010, and 100+110+1=1011. The addition of 101+001=110 with a carry out of 0, thus the carry in of 0 calculation for the 100+110 addition should be used. The two calculations are then concatenated together to form (1010) (110)=1010110. Note that the additions of the two segments can be performed in parallel. Further note that a 2 to 1 multiplexer (MUX) is typically used to select between the carry 0 and carry 1 calculations.

The only difference between the carry in of 0 calculation and the carry in of 1 calculation is in the carry in to each bit. Hence, two signals are used to encode the conditional carry in to each bit in the block; C0 is the carry in to a bit for carry in to the block of zero, and C1 is the carry in to the bit for carry in to this block of one. In a dual-rail domino implementation, the C0 and C1 inputs become four signals to represent each bit in the segment: C0H, C0L, and C1H, C1L. Thus, the carry in to a particular bit may be H or "true" if the carry in to the block is 0, which is represented by C0H. Similarly the carry in to a particular bit may be L or "false" if the carry in to the block is 0, C0L. Note that C0H and C0L are complements of each other. Similar statements may be made for C1H and C1L. Therefore, the four signals represent the actual and the complement of the signals C0 and C1, with H being the true or actual, and L being the false or complement.

Each of the four signals are required for processing of the carrys, because logical circuits within the system, such as exclusive OR, use both true and complements of input signals. Each of these signals must be generated, and transmitted through the system, and then routed to appropriate destinations. This is costly in terms of chip complexity, and chip area used.

Therefore, there is a need in the art for a carry select adder that requires fewer signals to be generated and transmitted through the system.

BRIEF SUMMARY OF THE INVENTION

These and other objects, features and technical advantages are achieved by a system and method which has a reduced number of encoded signals to represent the conditional carry bit.

In considering the operation of a carry chain, it is apparent that not all possible combinations of C0H, C0L and C1H, C1L need to be generated. For example, C0H always implies C1H, in other words if carry in to a bit is true for block carry in of zero, then carry in to this bit will certainly be true for block carry in of one. If C0H is true, then the carry into the bit is generated within the block, and thus, would not be affected by the addition of 1 from a block carry in of 1. Thus, C1H does not have to be calculated for this bit. Similarly, C1L always implies C0L, in other words if carry in to a bit is false for block carry in of one, then carry in to the bit will certainly be false for block carry in of zero. If C1L is true, then the carry into the block is lost within the block, and thus, the carry in to the bit would not be affected by the subtraction of 1 from a block carry in of 0. Thus, C0L does not have to be calculated for this bit. Note that with the complement pairs, i.e. C0H & C0L and C1H & C1L, only one of each pair will be true at any given time.

Therefore, a more compact encoding of the C0/C1 bits is possible. In keeping with the PKG naming convention (Propagate, Kill, Generate) of encoding the adder inputs, one-of-three encoding can be used to represent the conditional carry into a bit. Only one of the signals would be high at any time, the other two would be low. The three signals are Gin, Kin, and Pin. The Gin signal is true where a bit has a carry in of one regardless of carry in to the block, i.e. the carry in to the bit is generated within the block. The Kin signal is true where a carry in to a bit is zero regardless of the carry in to the block, i.e. any carry in to the block is killed before it gets to the bit. The Pin signal is true where a bit has a carry in that is the same as the carry in to the block, i.e. the carry in to the block is propagated up to the bit. These signals are used in the calculation of the sum bits, i.e. the actual bits of the bit streams being added together.

Since only three signals are generated, the number of field-effect transistors (FETs) required to implement the adder are reduced. Moreover, since only three signals are being transmitted, the amount of routing mechanisms, e.g. wire, is also reduced. Thus, the complexity and surface area of the adder are reduced.

Therefore, it is a technical advantage of one aspect of the present invention to have one-of-three encoding to represent the conditional carry into each bit of a block of bits. It is a further technical advantage of one aspect of the present invention to represent the signals as propagate, kill, or generate, based upon the carry in to the block.

It is still a further technical advantage of one aspect of the present invention to provide a system and method which has a reduced number of encoded signals to represent a conditional carry bit in addition operations. Accordingly, it is a technical advantage of one aspect of the present invention to reduce chip complexity (i.e., circuitry complexity) required for performing addition operations. Also, it is a technical advantage of one aspect of the present invention to reduce the chip area required for performing addition operations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

Figure 1:
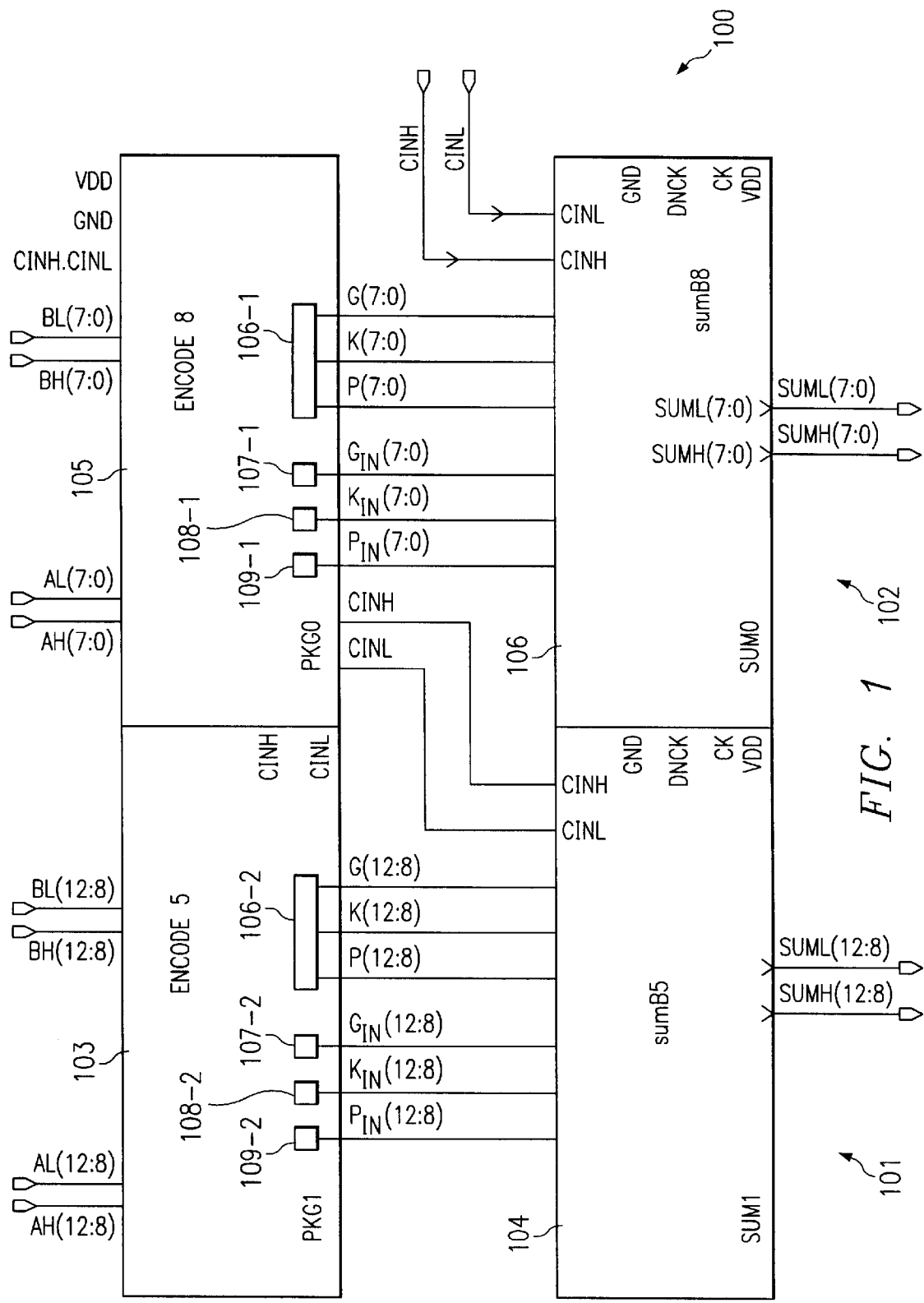
FIG. 1 depicts an exemplary chip arrangement for a carry select adder incorporating the present invention.

FIG. 1 depicts a carry select adder 100, which is a 13 bit adder that has been separated into two segments. The most significant bit segment 101 is 5 bits and the lower significant bit segment 102 is 8 bits. Bit segment 101 includes an encoding generator 103 and a sum generator 104. Bit segment 102 includes an encoding generator 105 and a sum generator 106. Each encoding generator receives operands A and B as inputs, with both true and false signals for each of the inputs, i.e. AH, AL, BH, and BL. Note that the 13 bit inputs have been separated into 5 and 8 bit blocks. The encoding generators produce P, G, K, and Pin, Gin, Kin, for each of the input bits in their respective blocks and are sent out to the sum generators. The calculation of P, G, K and Pin, Gin, Kin is described elsewhere in this disclosure. Each of the sum generators produces a sum of the input operands A and B, via their encoded form of P, G, K, and Pin, Gin, Kin. Such sum is expressed as SUMH and SUML, which is the sum signal and its complement. The calculation of SUMH and SUML is described elsewhere in this disclosure.

Encoding generator 105 produces the CinH and CinL for use in the encoding generator 103 and sum generator 104, as shown by CinH and CinL in FIG. 1. Encoding generator 103 produces CinH and CinL for a subsequent adder (not shown).

The prior art discloses encoding the two bits of the operands in a one-of-three encoding. The addition of two binary bits have four possible scenarios for the two operands, i.e. 00, 01, 10, and 11. The behavior of the operands is characterized in terms of the carry out of the operands. The behavior can be characterized as propagate, kill, or generate (PKG). Thus the four possible combinations are encoded as one-of-three encoding, or PKG encoding. Thus, the carry out of two operand bits can be represented by PKG encoding.

If the two operand bits tend to propagate a carry, i.e. the carry out equals the carry in, then these operands are considered P operands. The P operands are 01 and 10. Thus, if a carry is 1, then (0+1)+1 equals 0 with a carry of 1. Similarly, if a carry is 0, then (0+1)+0 equals 1 with a carry of 0. The operands of (1+0) behave similarly. If the two operand bits tend to kill a carry, i.e. the carry out always equals 0, then these operands are considered K operands. The K operands are 00. Thus, if a carry is 1, then (0+0)+1 equals 1 with a carry of 0. Similarly, if a carry is 0, then (0+0)+0 equals 0 with a carry of 0. If the two operand bits tend to generate a carry, i.e. the carry out always equals 1, then these operands are considered G operands. The G operands are 11. Thus, if a carry is 1, then (1+1)+1 equals 1 with a carry of 1. Similarly, if a carry is 0, then (1+1)+0 equals 0 with a carry of 1. Accordingly, the carry out of two operand bits can be represented by the three signals P, K and G.

Note that the above encoding could be performed by implementing a circuit comprising a logical AND, a logical NOR, and a logical XOR. The logical AND would be true if the operands are G operands. The logical NOR would be true if the operands are K operands. The logical XOR would be true if the operands are P operands. Note that only one of the three logic circuits would be true for any given pair of operands, the others would be false.

In accordance with the present invention, the concept of PKG encoding is extended from the encoding of the operands to encode the conditional carries. That is, the carry look-ahead signals are utilized to replace the C0 and C1 signals of the prior art. Accordingly, one-of-three encoding may be utilized to represent the conditional carry in to a bit, thus reducing the number of signals required for carry select addition. In a preferred embodiment, Pin, Kin and Gin signals are used to represent the conditional carry in to each bit of the operands being added. The Pin signal is true where a bit has a carry in that is the same as the carry in to the block, i.e., the carry in to the block is propagated up to the bit. The Kin signal is true where a carry in to a bit is zero regardless of the carry in to the block, i.e. any carry in to the block is killed before it gets to the bit. The Gin signal is true where a bit has a carry in of one regardless of carry in to the block, i.e., the carry in to the bit is generated within the block.

The equations for calculating Pin, Kin, and Gin are standard equations for carry look-ahead addition, which are well known within the art. The equations for Pin, Kin, and Gin for the i'th bit in an n+1 bit block with inputs P[n:0] K[n:0] G[n:0], where PKG are for operand pairs, are as follows:

$$\text{Gin}[i] = G[i-1] + P[i-1]G[i-2] + P[i-1]P[i-2]G[i-3] + \ldots + P[i-1] \ldots P[1]G[0]$$

$$\text{Kin}[i] = K[i-1] + P[i-1]K[i-2] + P[i-1]P[i-2]K[i-3] + \ldots + P[i-1] \ldots P[1]K[0]$$

$$\text{Pin}[i] = P[i-1]P[i-2] \ldots P[0]$$

The equations utilized for determining Pin, Kin and Gin are best understood when viewed with an example. Assume that two blocks or bit streams are being added together, i.e. 0101 and 0011. The two streams have 4 sets of corresponding operand bits to be added together. The first set of corresponding operand bits is the least significant bits of the streams, i.e. (1+1). Moving up the streams, the next set of corresponding operand bits is (0+1). Moving further up the streams, the third set of corresponding operand bits is (1+0). Finally, the fourth set of corresponding operand bits is the most significant bits of the streams, i.e. (0+0). Focusing on the fourth set of corresponding operand bits, the Gin, Kin, and Pin for the most significant bits of the streams, i.e. (0+0), are calculated as follows.

$$Gin[0,0]=G[1,0]+P[1,0]G[0,1]+P[1,0]P[0,1]G[1,1]$$

The bits [1,0] and [0,1] are P operands, thus G[1,0] is false or 0, G[0,1] is false or 0, P[1,0] is true or 1, and P[0,1] is true or 1. The bits [1,1] are G operands, thus G[1,1] is true or 1. Thus Gin[0,0]=0+1×0+1×1×1=1. Since Gin is true, then the carry is generated within the block, and the carry into the block does not have an impact on the carry for these bits. This proves out by noting that 101+011 (the remaining bits of the streams) +0 carry in to the blocks yields 000 with carry out of 1, and 101+011+1 carry in to the blocks yields 001 with carry out of 1. Since Gin is true Kin and Pin should be false. Note that for Gin to be true, then either the next lower bits would have to be G bits, as reflected by the first term of the equation, G[i−1], or elsewhere in the bit stream, G bits would have to exist which are propagated forward, which is reflected by the remaining terms of the equation with G being multiplied by one or more P terms.

$$Kin[0,0]=K[1,0]+P[1,0]K[0,1]+P[1,0]P[1,0]K[1,1]$$

Recall that K operands are 00. The bits [1,0] and [0,1] are P operands, thus K[1,0] is false or 0, K[0,1] is false or 0, P[1,0] is true or 1, and P[0,1] is true or 1. The bits [1,1] are G operands, thus K[1,1] is false or 0. Therefore, Kin[0,0]=0+1×0+1×1×0=0. Accordingly, for this example Kin[0,0] is false. If Kin is true, then any carry is killed within the block, and the carry into the block does not have an impact on the carry for these bits. Note that for Kin to be true, then either the next lower bits would have to be K bits, as reflected by the first term of the equation, K[i−1], or elsewhere in the bit stream, K bits would have to exist which are propagated forward, which is reflected by the remaining terms of the equation with K being multiplied by one or more P terms.

$$Pin[0,0]=P[1,0]P[0,1]P[0,1]$$

The bits [1,0] and [0,1] are P operands, thus P[1,0] is true or 1, and P[0,1] is true or 1. The bits [1,1] are G operands, thus P[1,1] is false or 0. Thus, Pin[0,0]=1×1×0=0. Accordingly, for this example Pin[0,0] is false. If Pin is true, then any carry for these bits depends upon the carry into the block. Note that for Pin to be true for a set of bits, then each of the bit pairs downstream (or of lower significance) would have to be P bits, so that the carry into the block is propagated forward, which is reflected by the sole terms of the equation.

In a preferred embodiment, the Pin, Kin and Gin signals are used in the calculation of the sum, SumH, of the operands. Since complements are often required in dual-rail domino circuits, a complement version of the sum, SumL, is also calculated.

The equations for SumH, and SumL for the i'th bit in an n+1 bit block with inputs P[n:0] K[n:0] G[n:0], where P/K/G[i] inputs for this i'th bit, and Cin is the known block carry select, with CinH being the actual, and CinL being the complement are represented as follows:

$$SumH[i]=Gin[i](K[i]+G[i])+Kin[i]P[i]+CinH*Pin[i](K[i]+G[i])+CinL*Pin[i]*P[i]$$

$$SumL[i]=Kin[i](K[i]+G[i])+Gin[i]P[i]+CinL*Pin[i](K[i]+G[i])+CinH*Pin[i]*P[i]$$

These equations are best understood when viewed with an example. Assume that the same two blocks or bit streams, as above, are being added together, i.e. 0101 and 0011. Further assume the two most significant bits are being added together, i.e (0+0). From above, Gin[0,0]=1, and both Kin [0,0] and Pin[0,0]=0. Note that the bits [0,0] are K operands, thus P[0,0] is false or 0, G[0,0] is false or 0, and K[0,0] is true or 1.

Thus, SumH[0,0]=1(1+0)+0×0+CinH*0(1+0)+CinL*0*0=1, which agrees with 0+0+ a carry of 1. The first term of the equation indicates that a sum of 1 will be achieved if there is a carry in of 1, Gin, and either the current operands are 0,0 (K) or 1,1 (G), thus SumH will equal 1 via 0+0+ carry 1 or 1+1+ carry 1. The next term indicates that a sum of 1 will be achieved if there is a carry in of 0, Kin, and the current operands are 0,1 or 1,0 (P). The next two terms indicate that the carry in is not known, Pin, and thus depends upon the actual carry in Cin. Assume Cin equals 1, then CinH=1 and CinL=0, thus a sum of 1 can be achieved with a carry in of 1, if the current operands are 0,0 (K) or 1,1 (G). A sum of 1 could not be achieved with the current operands being 0,1 or 1,0 (P), as shown in the second P term. Assume Cin equals 0, then CinH=0 and CinL=1, thus a sum of 1 can be achieved with a carry in of 0, if the current operands are 0,1 or 1,0 (P). A sum of 1 could not be achieved with the current operands being 0,0 (K) or 1,1 (G).

From the above example, SumL[0,0]=0 (1+0)+1×0+CinL*0 (1+0)+CinH*0*0=0,which agrees with the complement of SumH. The first term of the equation indicates that a sum of 0 will be achieved if there is a carry in of 0, Kin, and either the current operands are 0,0 (K) or 1,1 (G), thus SumL will equal 0 via 0+0+ carry 0 or 1+1+ carry 0. The next term indicates that a sum of 0 will be achieved if there is a carry in of 1, Gin, and the current operands are 0,1 or 1,0 (P). The next two terms indicate that the carry in is not known, Pin, and thus depends upon the actual carry in Cin. Assume Cin equals 0, then CinH=0 and CinL=1, thus a sum of 0 can be achieved with a carry in of 0, if the current operands are 0,0 (K) or 1,1 (G). A sum of 0 could not be achieved with the current operands being 0,1 or 1,0 (P), as shown in the second P term. Assume Cin equals 1, then CinH=1 and CinL=0, thus a sum of 0 can be achieved with a carry in of 1, if the current operands are 0,1 or 1,0 (P). A sum of 0 could not be achieved with the current operands being 0,0 (K) or 1,1 (G).

As the above examples illustrate, the sum for each bit of a block of bits may be determined utilizing the Pin, Kin, and Gin signals for the carry in to each bit, without being required to maintain the C0H, C0L, C1H, and C1L signals of the prior art. Accordingly, the overall number of signals required for performing carry select addition is reduced. As result, the complexity and area required for the circuitry of a carry select adder is reduced.

Figure 2A:
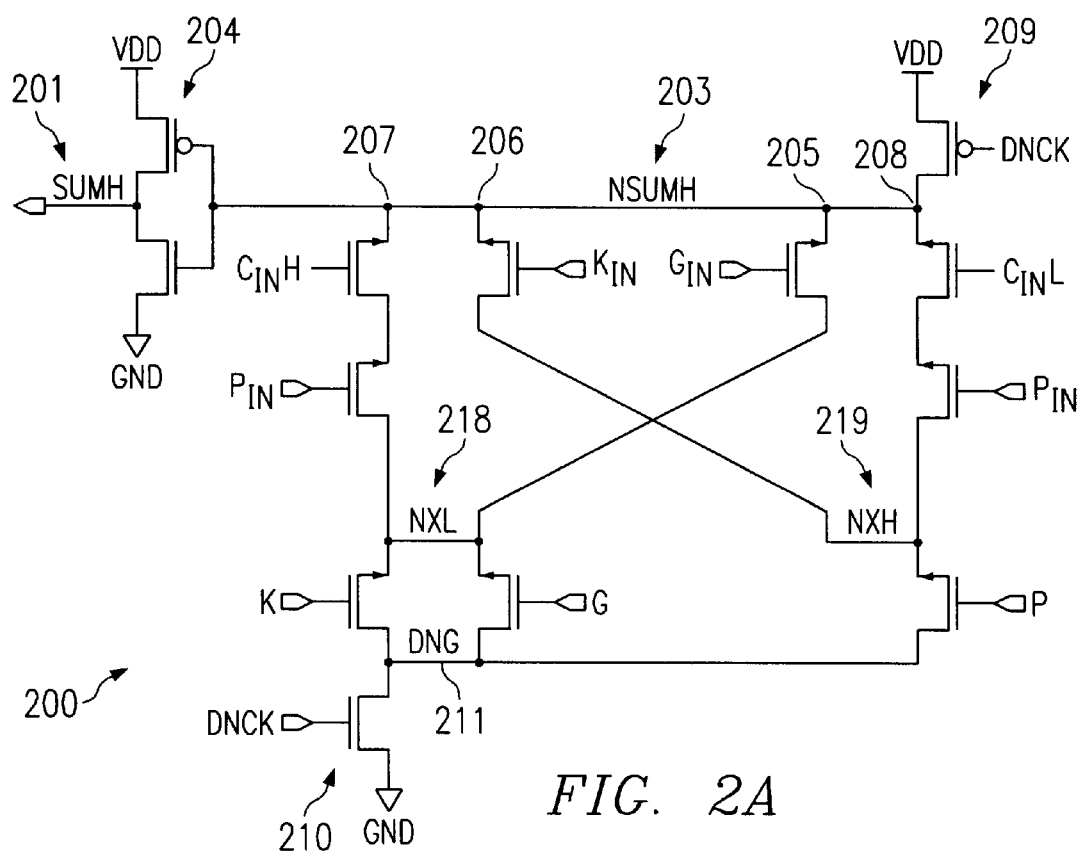
FIGS. 2A–2B depict exemplary FET implementations for the sum circuits in the carry select adder.
Figure 2B:
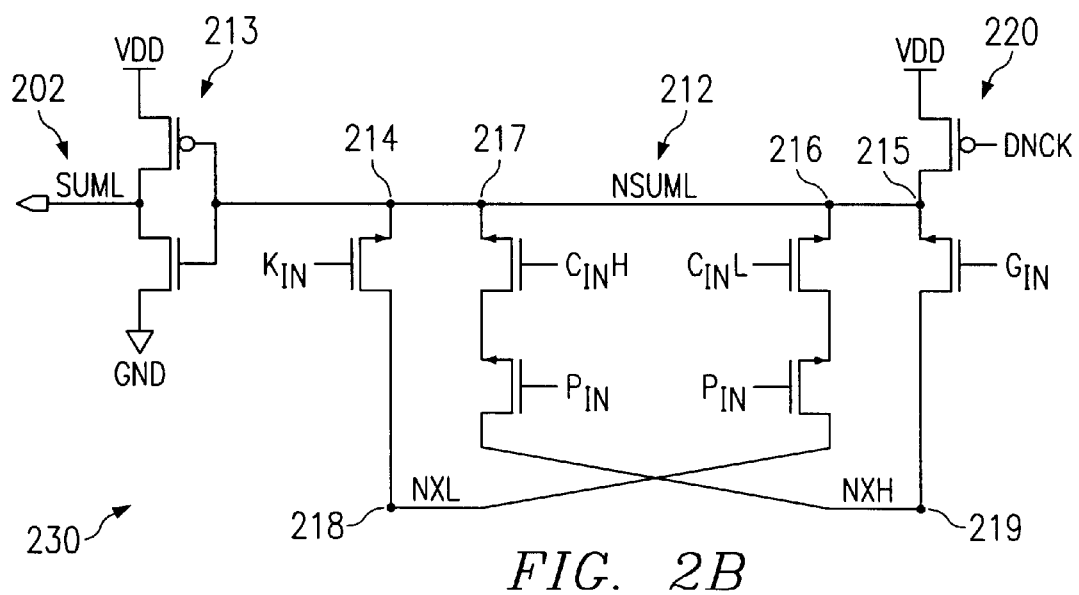

FIGS. 2A–2B depict circuits comprised of FETs, including pFETs (or p type FETs or P-Channel FETs), and nFETs (or n type FETs or N-Channel FETs). pFETs are depicted with the circle by the gate, and turn on if the voltage at the gate is ground. nFETs are depicted without the circle by the gate, and turn on if the voltage at the gate is high.

FIGS. 2A and 2B depict dual-rail domino logic circuits to implement the calculation of SumH 201 and SumL, 202 respectively. In FIG. 2A, node NSUMH 203 is connected to the various logic chains, each of which represents a term in the SumH equation. Node NSUMH 203 is connected to output SUMH 201 via inverter 204, which is comprised of a pFET and a nFET. When NSUMH is high, SUMH is low, via ground. When NSUMH is low, SUMH is high, via Vdd. NSUMH will go low when any one of the chains allows it to connect to ground.

Chain 205 is the FET implementation of the first term of the SumH equation. Chain 205 connects NSUMH 203 to ground if Gin is true and either K or G is true. Chain 206 is the FET implementation of the second term of the SumH equation. Chain 206 connects NSUMH 203 to ground if Kin is true and P is true. Chain 207 is the FET implementation of the third term of the SumH equation. Chain 207 connects NSUMH 203 to ground if CinH is true and Pin is true and either K or G is true. Chain 208 is the FET implementation of the fourth term of the SumH equation. Chain 208 connects NSUMH 203 to ground if CinL is true and Pin is true and P is true. Note that when clock signal DNCK is low, FET 209 is on and connects NSUMH to Vdd. Thus, NSUMH begins in a high state and is not brought to ground until connected to ground by one of the chains 205, 206, 207, and 208. Further note that clock signal DNCK goes to high when the sum circuit 200 becomes active, and turns on FET 210, which brings node DNG 211 to ground. DNG 211 serves as the ground connection for chains 205, 206, 207, and 208. Also note that when DNCK goes high, FET 209 turns off and disconnects NSUMH from Vdd. Note that FIG. 2A is by way of example only as other circuits could be constructed to implement the SumH equation.

In FIG. 2B, node NSUML 212 is connected to the various logic chains, each of which represents a term in the SumL equation. Note that when SUML 202 is high or true, then the sum is zero. Node NSUML 221 is connected to output SUML 202 via inverter 213, which is comprised of a pFET and a nFET. When NSUML is high, SUML is low, via ground. When NSUML is low, SUML is high, via Vdd. NSUML is low when any one of the chains is low.

Chain 214 is the FET implementation of the first term of the SumL equation. Chain 214 connects NSUML 212 to ground if Kin is true and either K or G is true. Note that node NXL 218 connects to common circuitry in FIG. 2A, this reduces the number of FETs required to construct the circuits 200, 230. Chain 215 is the FET implementation of the second term of the SumL equation. Chain 215 connects NSUML 212 to ground if Gin is true and P is true. Note that node NXH 219 connects to common circuitry in FIG. 2A, this reduces the number of FETs required to construct the circuits 200, 230. Chain 216 is the FET implementation of the third term of the SumL equation. Chain 216 connects NSUIML 212 to ground if CinL is true and Pin is true and either K or G is true. Chain 217 is the FET implementation of the fourth term of the SumL equation. Chain 217 connects NSUML 212 to ground if CinH is true and Pin is true and P is true. Note that when clock signal DNCK is low, FET 220 is on and connects NSUML to Vdd. Thus, NSUML begins in a high state and is not brought to ground until connected to ground by one of the chains 214, 215, 216, and 217. Further note that nodes NXL 218 and NXH 219 connect to node DNG 211 via various FETs. Thus, DNG 211 also serves as the ground connection for chains 214, 215, 216, and 217. Also note that when DNCK goes high, FET 220 turns off and disconnects NSUML from Vdd. Note that FIG. 2B is by way of example only as other circuits could be constructed to implement the SumL equation.

FIGS. 2A and 2B illustrate a standard domino CMOS operation. When DNCK goes low, NSUMH and NSUML are precharged to VDD. When DNCK goes high, NSUMH and NSUML maintain this voltage because of a capacitor (not shown) consisting of the output inverter (204, 213) gate capacitance plus any other parasitic capacitance on NSUMH and NSUML. If a path to ground is created while DNCK is high, this capacitance is discharged and NSUMH or NSUML will go low, allowing SUMH or SUML to go high, respectively.

Note that the sum generator 104 would have five instances of the sum circuits of FIGS. 2A and 2B, with one instance for each input bit. Similarly, the sum generator 106 would have eight instances of the sum circuits of FIGS. 2A and 2B, with one instance for each input bit.

It should be understood that the present invention may be implemented such that a 1 represents a high (or true) and a 0 represents a low (or false), or the present invention may be implemented in an opposite fashion wherein a 0 represents a high (or true) and a 1 represents a low (or false). It should be understood that the present invention may be implemented such that a high is true and a low is false, or the present invention may be implemented such that a high is false and a low is true. Any such implementation is intended to be within the scope of the present invention.

It should also be understood that the disclosed invention may be implemented with various circuit configurations, and the present invention is not intended to be limited only to those configurations disclosed herein, rather the circuit configurations provided herein are intended as examples that render the disclosure enabling for many other configurations. It should also be understood that the disclosed invention may be implemented for various block sizes of operands. That is, the present invention is not intended to be limited to only the blocks of 8 bits and 5 bits disclosed herein, rather the blocks provided herein are intended as examples that render the disclosure enabling for many other implementations of block sizes.

It should be understood that the disclosed invention may be implemented for operands having more than two blocks. It should also be understood that the disclosed invention may be implemented for operands comprising only one block. That is, the present invention is not intended to be limited only to operands that are divided into two blocks, rather the number of blocks provided herein are intended as examples that render the disclosure enabling for many of implementations having operands comprising any number of blocks.

It should further be understood that the disclosed invention may be implemented utilizing various types of semiconductor devices, including but not limited to, bipolar, metal oxide semiconductor (MOS), complementary metal oxide semiconductor (CMOS), bi-CMOS, etc., and any such implementation is intended to be within the scope of the present invention. It should also be understood that the pFET and nFET devices disclosed herein can be enhancement or depletion type FETs.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing binary addition with a conditional carry, the method comprising:

utilizing logic circuitry to receive at least two operands, wherein each of said at least two operands comprise at least one block of bits;

representing the carry in to each bit of said at least one block of bits with three signals, wherein one of said three signals (Gin) represents whether a carry in to a set of corresponding operand bits of said at least one block of bits is generated within said at least one block of bits, wherein another of said three signals (Kin) represents whether any carry in to the said at least one block of bits is killed before reaching said set of corresponding operand bits, and wherein another of said three signals (Pin) represents whether a carry in to the said at least one block of bits is propagated to said set of corresponding operand bits; and calculating the sum of said at least two operands using said Gin, Kin and Pin signals.

2. The method of claim 1, further comprising:

representing the carry out of said at least one block of bits with three signals, wherein one of said three signals (G) represents whether a carry out from said at least one block of bits is generated regardless of the carry in to said at least one block of bits, wherein another of said three signals (K) represents whether a carry in to said at least one block of bits is killed within said at least one block of bits, and wherein another of said three signals (P) represents whether a carry in to said at least one block of bits is propagated to said carry out of said at least one block of bits.

3. The method of claim 2, further comprising:

utilizing logic circuitry for receiving a signal representing the carry in (Cin) to said at least one block of bits, wherein said actual carry in to said at least one block of bits is represented by a signal (CinH) and the complement of said actual carry in is represented by a signal (CinL); and said calculating is performed according to the equation:

SumH[$i$]=Gin[$i$](K[$i$]+G[$i$])+Kin[$i$]P[$i$]+CinH*Pin[$i$](K[$i$]+G[$i$])+CinL*Pin[$i$]*P[$i$].

4. The method of claim 2, further comprising:

utilizing logic circuitry for receiving a signal representing the carry in (Cin) to said at least one block of bits, wherein said actual carry in to said at least one block of bits is represented by a signal (CinH) and the complement of said actual carry in is represented by a signal (CinL); and said calculating is performed according to the equation:

SumL[$i$]=Kin[$i$](K[$i$]+G[$i$])+Gin[$i$]P[$i$]+CinL*Pin[$i$](K[$i$]+G[$i$])+CinH*Pin[$i$]*P[$i$].

5. The method of claim 2, wherein said Gin is determined for each bit (i) of said at least one block according to the equation:

Gin[$i$]=G[$i$−1]+P[$i$−1]G[$i$−2]+P[$i$−1]P[$i$−2]G[$i$−3]+ . . . +P[$i$−1] . . . P[1]G[0].

6. The method of claim 2, wherein said Kin is determined for each bit (i) of said at least one block according to the equation:

Kin[$i$]=K[$i$−1]+P[$i$−1]K[$i$−2]+P[$i$−1]P[$i$−2]K[$i$−3]+ . . . +P[$i$−1] . . . P[1]K[0].

7. The method of claim 2, wherein said Pin is determined for each bit (i) of said at least one block according to the equation:

Pin[$i$]=P[$i$−1]P[$i$−2] . . . P[0].

8. The method of claim 2, wherein said P signal is true when said operand bits are 01 and 10; said K signal is true when said operand bits are 00; and said G signal is true when said operand bits are 11.

9. The method of claim 1, wherein said at least one block of bits comprises a group of 1 or more bits.

10. A system for performing binary carry select addition utilizing conditional carry encoding, the system comprising:

a first encoding generator that receives at least a first block of bits for each of at least two operands to be added, said first encoding generator comprising, a first circuit that determines a carry in to each bit of said at least two operands, wherein said encoding generator determines if said bits of said at least two operands propagate a carry (P), if said bits of said at least two operands kill a carry (K), and if said bits of said at least two operands generate a carry (G), a second circuit that determines if each set of corresponding operand bits (i) to be added has a carry in that is the same as the carry in to the said first block of bits (Pin), a third circuit that determines if each set of corresponding operand bits (i) has a carry in of zero regardless of the carry in to the said first block of bits (Kin), and a fourth circuit that determines if each set of corresponding operand bits (i) has a carry in of one regardless of the carry in to the said first block of bits (Gin); and a first sum generator that calculates the sum of each set of corresponding operand bits (i) of said first block of bits for each of said at least two operands utilizing said Pin, Kin and Gin.

11. The system of claim 10, further comprising:

a dual-rail domino logic circuit that calculates the sum of each set of corresponding operand bits (i) of said operand bits.

12. The system of claim 10, further comprising:

a logic chain comprising circuitry that produces a high sum for a set of corresponding operand bits (i) of said at least two operands if the determined Gin for said set of corresponding operand bits (i) is high and at least one of said determined K for said set of corresponding operand bits (i) and determined G for said set of corresponding operand bits (i) are high.

13. The system of claim 10, further comprising:

a logic chain comprising circuitry that produces a high sum for a set of corresponding operand bits (i) of said at least two operands if the determined Kin for said set of corresponding operand bits (i) and the determined P for said set of corresponding operand bits (i) are high.

14. The system of claim 10, further comprising:

logic for receiving a signal representing the carry in (Cin) to said first block of bits, wherein said actual carry in to said first block of bits is represented by a signal (Cmli) and the complement of said actual carry in is represented by a signal (CinH).

15. The system of claim 14, further comprising:

a logic chain that produces a high sum for a set of corresponding operand bits (i) if said CinH and the determined Pin for said set of corresponding operand bits (i) are high and at least one of the determined K for said set of corresponding operand bits (i) and the determined G for said set of corresponding operand bits (i) are high.

16. The system of claim 14, further comprising:
a logic chain that produces a high sum for a set of corresponding operand bits (i) if said CinL and the determined Pin for said set of corresponding operand bits (i) and the determined P for said set of corresponding operand bits (i) are high.

17. A system for performing binary select addition utilizing conditional carry encoding, the system comprising:
a first encoding generator that receives at least a first block of bits for each of at least two operands to be added;
a first signal (P) representing whether said bits of said at least two operands propagate a carry out, said P signal generated by said first encoding generator;
a second signal (K) representing whether said bits of said at least two operands kill a carry out, said K signal generated by said first encoding generator;
a third signal (G) representing whether said bits of said at least two operands generate a carry out, said G signal generated by said first encoding generator;
a fourth signal (Pin) representing whether each set of corresponding operand bits (i) has a carry in that is the same as the carry in to said first block of bits, said Pin signal generated by said first encoding generator;
a fifth signal (Kin) representing if each set of corresponding operand bits (i) has a carry in of zero regardless of the carry in to said first block of bits, said Kin signal generated by said first encoding generator;
a sixth signal (Gin) representing if each set of corresponding operand bits (i) has a carry in of one regardless of the carry in to said first block of bits, said Gin signal generated by said first encoding generator; and
a first sum generator that receives said P, K, G, Pin, Kin, and Gin signals and generates a signal representing the sum of each set of corresponding operand bits (i) of said first block of bits for each of said at least two operands utilizing at least said Pin, Kin and Gin signals.

18. The system of claim 17, further comprising:
a first circuit chain, wherein if said Gin signal is high for a set of corresponding operand bits (i) and either said K signal is high for said set of corresponding operand bits (i) or said G signal is high for said set of corresponding operand bits (i), then said sum signal for said set of corresponding operand bits (i) is high; and
a second circuit chain, wherein if said Kin signal is high for said set of corresponding operand bits (i) and said P signal is high for said set of corresponding operand bits (i), then said sum signal for said set of corresponding operand bits (i) is high.

19. The system of claim 18, further comprising:
said first sum generator further receives a signal representing the carry in (Cin) to said first block of bits, wherein the actual carry in to said first block of bits is represented by a signal (CinH) and the complement of said actual carry in is represented by a signal (CinL);
a third circuit chain, wherein if said CinH signal is high for said set of corresponding operand bits (i) and said Pin signal is high for said set of corresponding operand bits (i), and either said K signal is high for said set of corresponding operand bits (i) or said G signal is high for said set of corresponding operand bits (i), then said sum signal for said set of corresponding operand bits (i) is high; and a fourth circuit chain, wherein if said CinL signal is high for said set of corresponding operand bits (i) and said Pin signal is high for said set of corresponding operand bits (i) and said P signal is high for said set of corresponding operand bits (i), then said sum signal for said set of corresponding operand bits (i) is high.

20. The system of claim 19, further comprising:
said first circuit chain comprising field-effect transistors arranged to produce a high sum signal for said set of corresponding operand bits (i) when said Gin signal is high for said set of corresponding operand bits (i) and either said K signal is high for said set of corresponding operand bits (i) or said G signal is high for said set of corresponding operand bits (i);
said second circuit chain comprising field-effect transistors arranged to produce a high sum signal for said set of corresponding operand bits (i) when said Kin signal is high for said set of corresponding operand bits (i) and said P signal is high for said set of corresponding operand bits (i);
said third circuit chain comprising field effect transistors arranged to produce a high sum signal for said set of corresponding operand bits (i) when said CinH signal is high for said set of corresponding operand bits (i) and said Pin signal is high for said set of corresponding operand bits (i), and either said K signal is high for said set of corresponding operand bits (i) or said G signal is high for said set of corresponding operand bits (i); and
said fourth circuit chain comprising field effect transistors arranged to produce a high sum signal for said set of corresponding operand bits (i) when said CinL signal is high for said set of corresponding operand bits (i) and said Pin signal is high for said set of corresponding operand bits (i) and said P signal is high for said set of corresponding operand bits (i).

21. A system for performing binary carry select addition utilizing conditional carry encoding, the system comprising:
a first encoding generator that receives at least a first block of bits for each of at least two operands to be added, said first encoding generator comprising,
a means for determining a carry in to each bit of said at least two operands, wherein said encoding generator determines if said bits of said at least two operands propagate a carry (P), if said bits of said at least two operands kill a carry (K), and if said bits of said at least two operands generate a carry (G),
a means for determining if each set of corresponding operand bits (i) to be added has a carry in that is the same as the carry in to the said first block of bits (Pin),
a means for determining if each set of corresponding operand bits (i) has a carry in of zero regardless of the carry in to the said first block of bits (Kin), and
a means for determining if each set of corresponding operand bits (i) has a carry in of one regardless of the carry in to the said first block of bits (Gin); and
a first sum generator for calculating the sum of each set of corresponding operand bits (i) of said first block of bits for each of said at least two operands utilizing said Pin, Kin and Gin.

* * * * *